(12) United States Patent
Bandera

(10) Patent No.: US 9,893,574 B2
(45) Date of Patent: Feb. 13, 2018

(54) MULTI-DEGREE OF FREEDOM SPHERICAL ACTUATOR

(71) Applicant: HONEYWELL INTERNATIONAL INC., Morristown, NJ (US)

(72) Inventor: Pablo Bandera, Avondale, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 286 days.

(21) Appl. No.: 14/792,799

(22) Filed: Jul. 7, 2015

(65) Prior Publication Data

US 2017/0012482 A1    Jan. 12, 2017

(51) Int. Cl.
| | | |
|---|---|---|
| H02K 1/27 | (2006.01) | |
| H02K 21/22 | (2006.01) | |
| H02K 1/12 | (2006.01) | |
| H02K 3/28 | (2006.01) | |

(52) U.S. Cl.
CPC .............. *H02K 1/27* (2013.01); *H02K 1/12* (2013.01); *H02K 3/28* (2013.01); *H02K 21/22* (2013.01); *H02K 2201/18* (2013.01)

(58) Field of Classification Search
CPC ................................................ H02K 2201/18
See application file for complete search history.

(56) References Cited

U.S. PATENT DOCUMENTS

| | | |
|---|---|---|
| 3,105,657 A | 10/1963 | Mueller et al. |
| 3,178,600 A | 4/1965 | Bers |
| 3,295,379 A | 1/1967 | Jensen et al. |
| 4,611,863 A | 9/1986 | Isely |
| 4,855,838 A | 8/1989 | Jones et al. |
| 4,961,352 A | 10/1990 | Downer et al. |
| 5,204,573 A | 4/1993 | Bederson et al. |
| 5,413,010 A | 5/1995 | Nakanishi et al. |

(Continued)

FOREIGN PATENT DOCUMENTS

| | | |
|---|---|---|
| CN | 102975868 | 3/2013 |
| GB | 802776 | 10/1958 |

(Continued)

OTHER PUBLICATIONS

Extended EP Search Report for Application No. 16175141.7-1809 dated Dec. 1, 2016.

(Continued)

*Primary Examiner* — Ramon M Barrera
(74) *Attorney, Agent, or Firm* — Lorenz & Kopf, LLP

(57) ABSTRACT

A multi-degree of freedom spherical actuator includes a spherical stator, a first coil, a second coil, an armature, and a plurality of magnets. The spherical stator has a first axis of symmetry, a second axis of symmetry, and a third axis of symmetry. The first, second, and third axes of symmetry are disposed perpendicular to each other. The first coil is wound on the spherical stator about the first axis of symmetry, and the second coil is wound on the spherical stator about the second axis of symmetry. The armature is spaced apart from, and surrounds at least a portion of, the spherical stator. The armature has an inner surface and is movable relative to the spherical stator. The magnets are coupled to, and extend from, the inner surface of the armature, and each of the magnets is spaced apart from the spherical stator.

18 Claims, 10 Drawing Sheets

(56) References Cited

U.S. PATENT DOCUMENTS

| | | | |
|---|---|---|---|
| 6,906,441 B2 | 6/2005 | Mendenhall | |
| 7,614,804 B2 | 11/2009 | Kim | |
| 7,630,620 B2 | 12/2009 | Benson et al. | |
| 7,675,208 B2 | 3/2010 | Bandera | |
| 7,812,507 B2 | 10/2010 | Takahashi et al. | |
| 7,960,896 B2 | 6/2011 | Takahashi et al. | |
| 7,969,375 B2 * | 6/2011 | Blalock | H01Q 1/125 343/757 |
| 8,459,383 B1 | 6/2013 | Burget | |
| 8,600,600 B2 | 12/2013 | Jung | |
| 2004/0021785 A1 | 2/2004 | Pshtissky et al. | |
| 2008/0073989 A1 | 3/2008 | Bandera | |
| 2011/0064403 A1 | 3/2011 | Nakano et al. | |
| 2012/0139744 A1 | 6/2012 | Ridgway | |
| 2014/0191626 A1 | 7/2014 | Hollis, Jr. et al. | |
| 2014/0209751 A1 | 7/2014 | Stagmer | |

FOREIGN PATENT DOCUMENTS

| | | |
|---|---|---|
| GB | 2330457 A | 4/1999 |
| JP | S60204252 A | 10/1985 |
| WO | 9919971 A1 | 4/1999 |
| WO | 2004001941 A1 | 12/2003 |

OTHER PUBLICATIONS

Bederson, B.B. et al.; Two Miniature Pan-Tilt Devices; Proceedings of the 1992 IEEE International Conference on Robotics and Automation; France, May 1992.

Wang, J. et al.; Multi-Degree-of-Freedom Spherical Permanent Magnet Motors; Proceedings of the 2001 IEEE International Conference on Robotics and Automation; Korea, May 21-26, 2001.

Bolognesi, P. et al.; Electromagnetic Actuators Featuring Multiple Degrees of Freedom: A Survey; Paper presented at ICEM 2004 Conference, Krakow (Poland) Sep. 5-8, 2004.

Bederson, B. B. et al.; A Miniature Pan-Tilt Actuator: The Spherical Pointing Motor; IEEE Transactions on Robotics and Automation, vol. 10, No. 3, Jun. 1994.

Miles, A.R.; They pop up here and there. Do they have a future? Spherical electric motors; Oct. 1990.

Steele, A.B.; Design of a Lorentz, Slotless Self-Bearing Motor for Space Applications; Dec. 13, 2002.

Choi, Y, et al.; Halbach Magnetic Circuit for Voice Coil Motor in Hard Disk Drives; Journal of Magnetics 15(3) 43-147, 2010.

Partial European Search Report for Application No. 17169156.1-1806 dated Oct. 11, 2017.

* cited by examiner

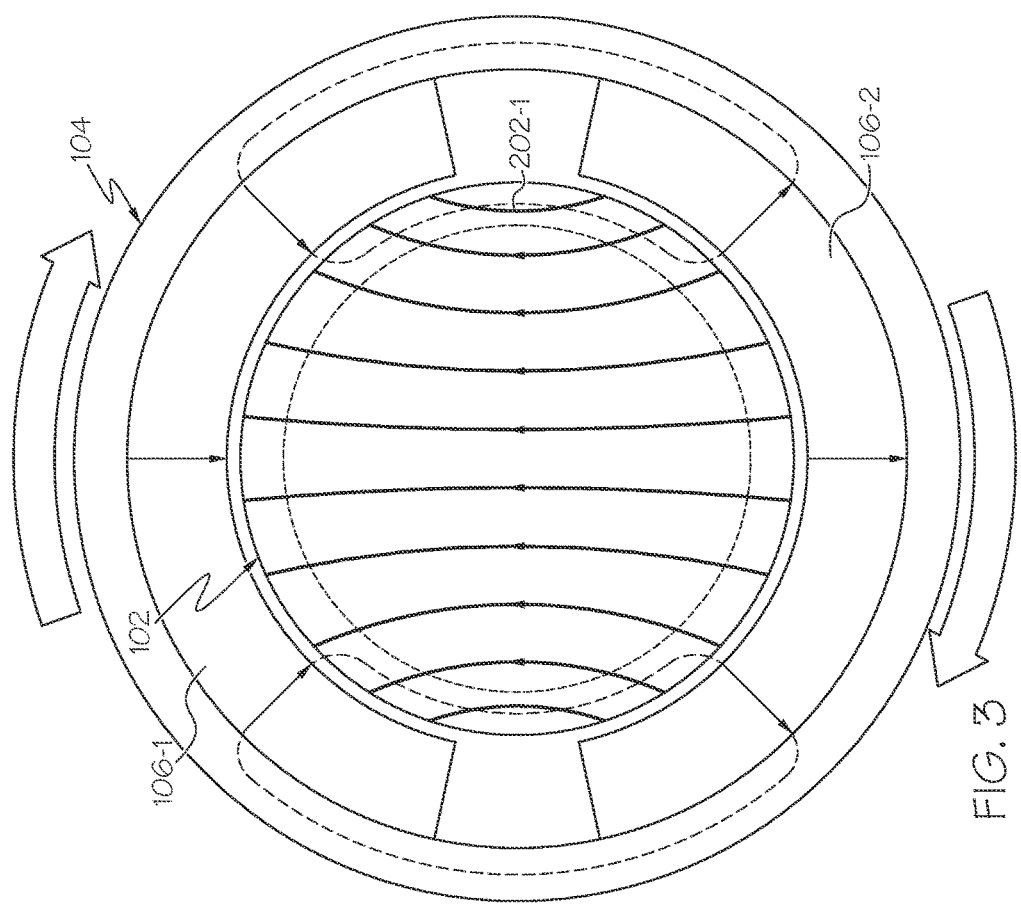

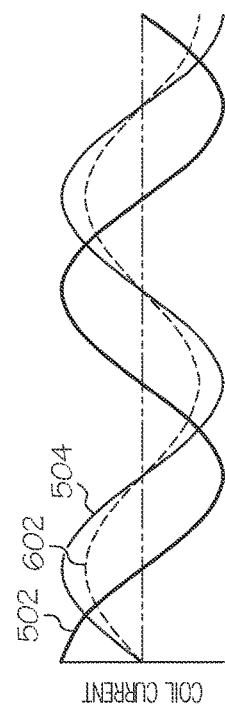
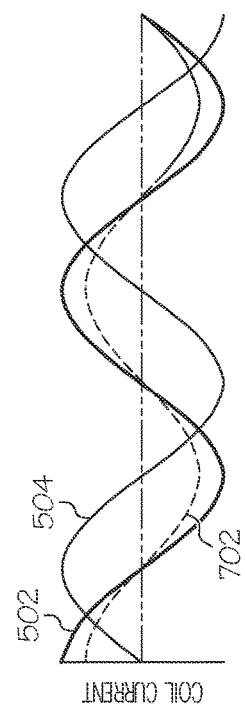
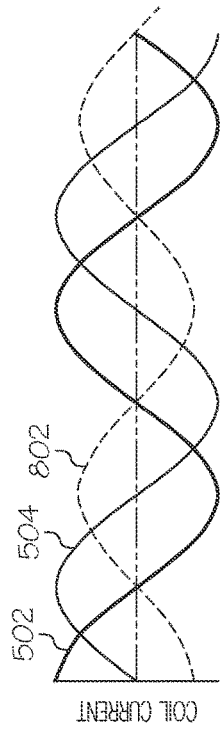
FIG. 6
FIG. 7
FIG. 8
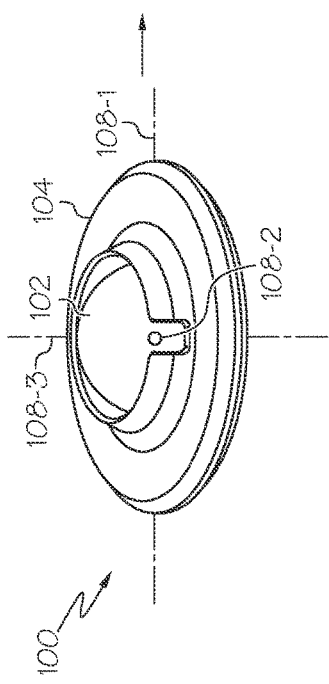
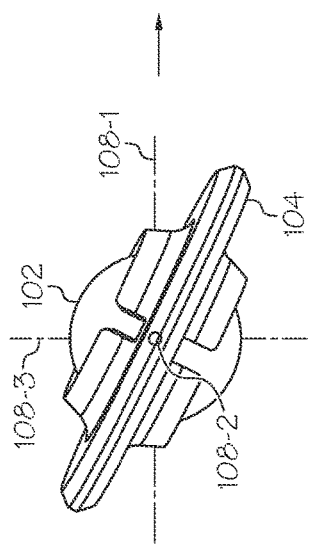
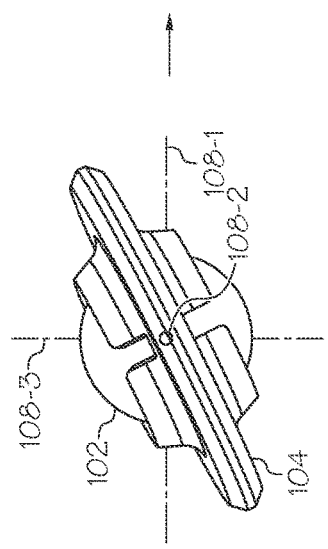

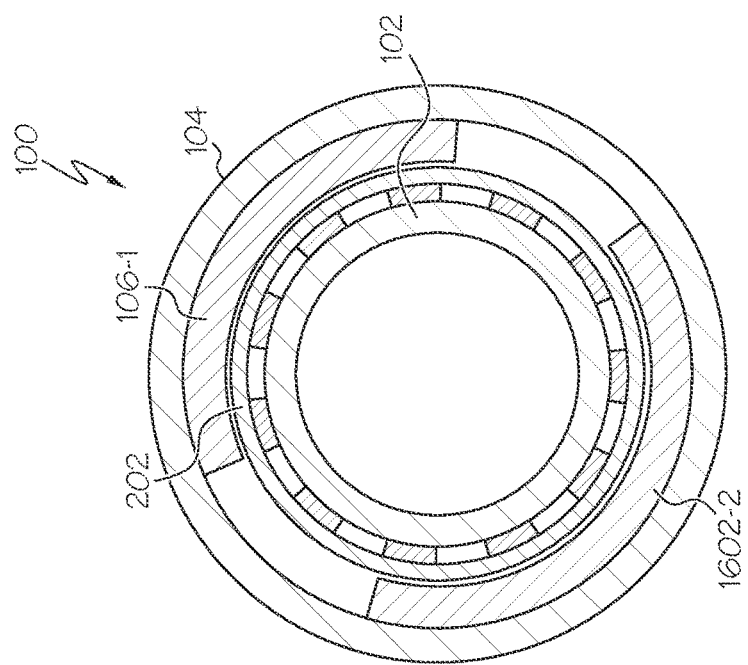
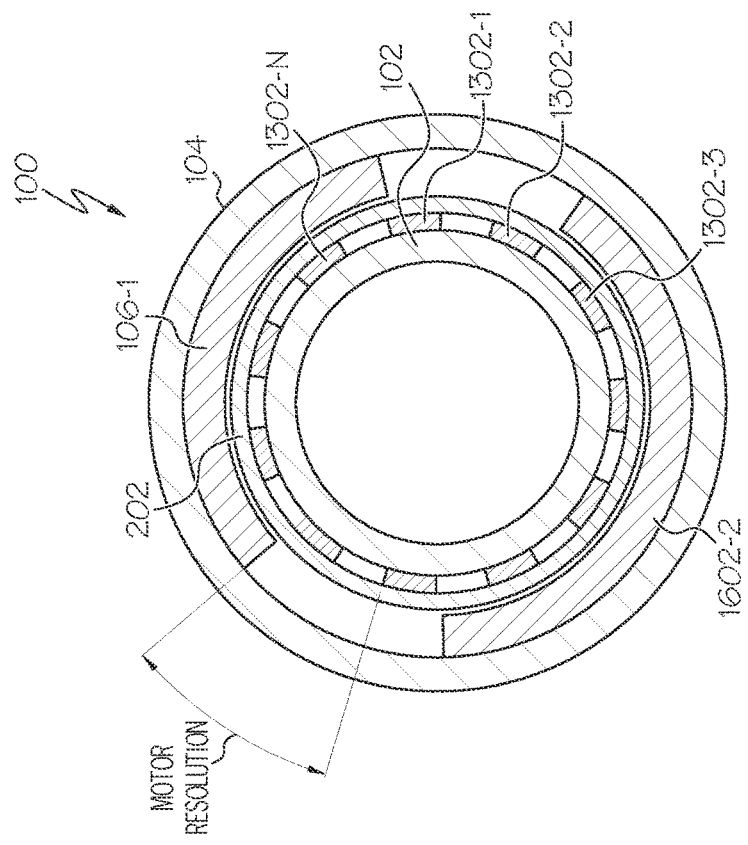
FIG. 13A
FIG. 13B

MULTI-DEGREE OF FREEDOM SPHERICAL ACTUATOR

TECHNICAL FIELD

The present invention generally relates to electromagnetic devices, and more particularly relates to a multi-degree of freedom spherical actuator.

BACKGROUND

It is generally known that currently available motion control systems that are designed to move an object in more than one degree of freedom (DoF) include a separate motor or actuator for each DoF. More specifically, at least two motors or actuators are needed to implement 2-DoF motion, at least three motors or actuators are needed to implement 3-DoF motion, and so on. Consequently, mechanisms that involve more than one DoF tend to be somewhat large and cumbersome, and therefore inefficient.

While electronics and sensor technologies have gotten significantly smaller in recent years, mechanical motion technology has not kept up. This is why motion systems such as pan/tilt mechanisms are typically not used on smaller platforms, such as mini- or micro-UAVs (unmanned air vehicles) and micro-satellites. Robotics systems, which depend on multi-DoF motion control, must simply put up with the inherent inefficiencies of current motion-on-motion systems.

One solution to the above-described problems is disclosed in U.S. Pat. No. 7,675,208, entitled "Global Pointing Actuator." The actuator disclosed therein includes a spherical stator with a "latitude coil" and a "longitude coil" wound thereon. This actuator, however, also exhibits certain drawbacks. For example, the longitude coil is physically difficult to wind. This is because the windings are not parallel and converge, or "bunch up," at the poles of the spherical stator. This adds to the overall cost and size, and reduces coil efficiency. Another drawback is that a separate centering torque is (e.g., springs or a magnetic detent) required to implement open-loop position control of the armature.

Hence, there is a need for a multi-degree of freedom spherical actuator that is relatively smaller, less cumbersome, and more efficient than known devices and/or does not include coils that are difficult to wind and/or does not rely on a separate centering torque to implement open-loop position control of the armature. The present invention addresses at least these needs.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a multi-degree of freedom spherical actuator includes a spherical stator, a first coil, a second coil, an armature, and a plurality of magnets. The spherical stator has a first axis of symmetry, a second axis of symmetry, and a third axis of symmetry. The first, second, and third axes of symmetry are disposed perpendicular to each other. The first coil is wound on the spherical stator about the first axis of symmetry, and the second coil is wound on the spherical stator about the second axis of symmetry. The armature is spaced apart from, and surrounds at least a portion of, the spherical stator. The armature has an inner surface and is movable relative to the spherical stator. The magnets are coupled to, and extend from, the inner surface of the armature, and each of the magnets is spaced apart from the spherical stator.

In another embodiment, a multi-degree of freedom spherical actuator, includes a spherical stator, a first coil, a second coil, a third coil, an armature, and a plurality of magnets. The spherical stator has a first axis of symmetry, a second axis of symmetry, and a third axis of symmetry. The first, second, and third axes of symmetry are disposed perpendicular to each other. The first coil is wound on the spherical stator about the first axis of symmetry, the second coil is wound on the spherical stator about the second axis of symmetry, and the third coil is wound on the spherical stator about the third axis of symmetry. The armature is spaced apart from, and surrounds at least a portion of, the spherical stator. The armature has an inner surface and is movable relative to the spherical stator to an armature position. The magnets are coupled to, and extend from, the inner surface of the armature, and each of the magnets is spaced apart from the spherical stator. The armature position is controlled in response to current magnitudes and directions in one or more of the first, second, and third coils.

In yet another embodiment, a multi-degree of freedom actuation control system includes a spherical stator, a first coil, a second coil, a third coil, an armature, a plurality of magnets, and a control. The spherical stator has a first axis of symmetry, a second axis of symmetry, and a third axis of symmetry. The first, second, and third axes of symmetry are disposed perpendicular to each other. The first coil is wound on the spherical stator about the first axis of symmetry, the second coil is wound on the spherical stator about the second axis of symmetry, and the third coil is wound on the spherical stator about the third axis of symmetry. The armature is spaced apart from, and surrounds at least a portion of, the spherical stator. The armature has an inner surface and is movable to an armature position relative to the spherical stator. The magnets are coupled to, and extend from, the inner surface of the armature, and each of the magnets is spaced apart from the spherical stator. The control is coupled to the first, second, and third coils and is configured to control current magnitudes and directions in each of the first, second, and third coils to thereby control the armature position.

Furthermore, other desirable features and characteristics of the multi-degree of freedom spherical actuator will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein:

FIG. 3 depicts a simplified cross section view of a portion of a multi-degree of freedom spherical actuator, illustrating how a torque is generated;

FIGS. 6-8 depict the multi-degree of freedom spherical actuator with the armature spinning and disposed in various armature positions;

FIGS. 13A and 13B depict another embodiment of the multi-degree of freedom spherical actuator.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

In this regard, it is noted that the multi-degree of freedom spherical actuator disclosed herein is, for ease of explanation and illustration, generally described as operating as a motor. Persons of ordinary skill in the art will appreciate, however, that the disclosed actuator may also be operated as a generator or a sensor (e.g., a rate sensor from generated back EMF), or numerous other devices.

Figure 1:
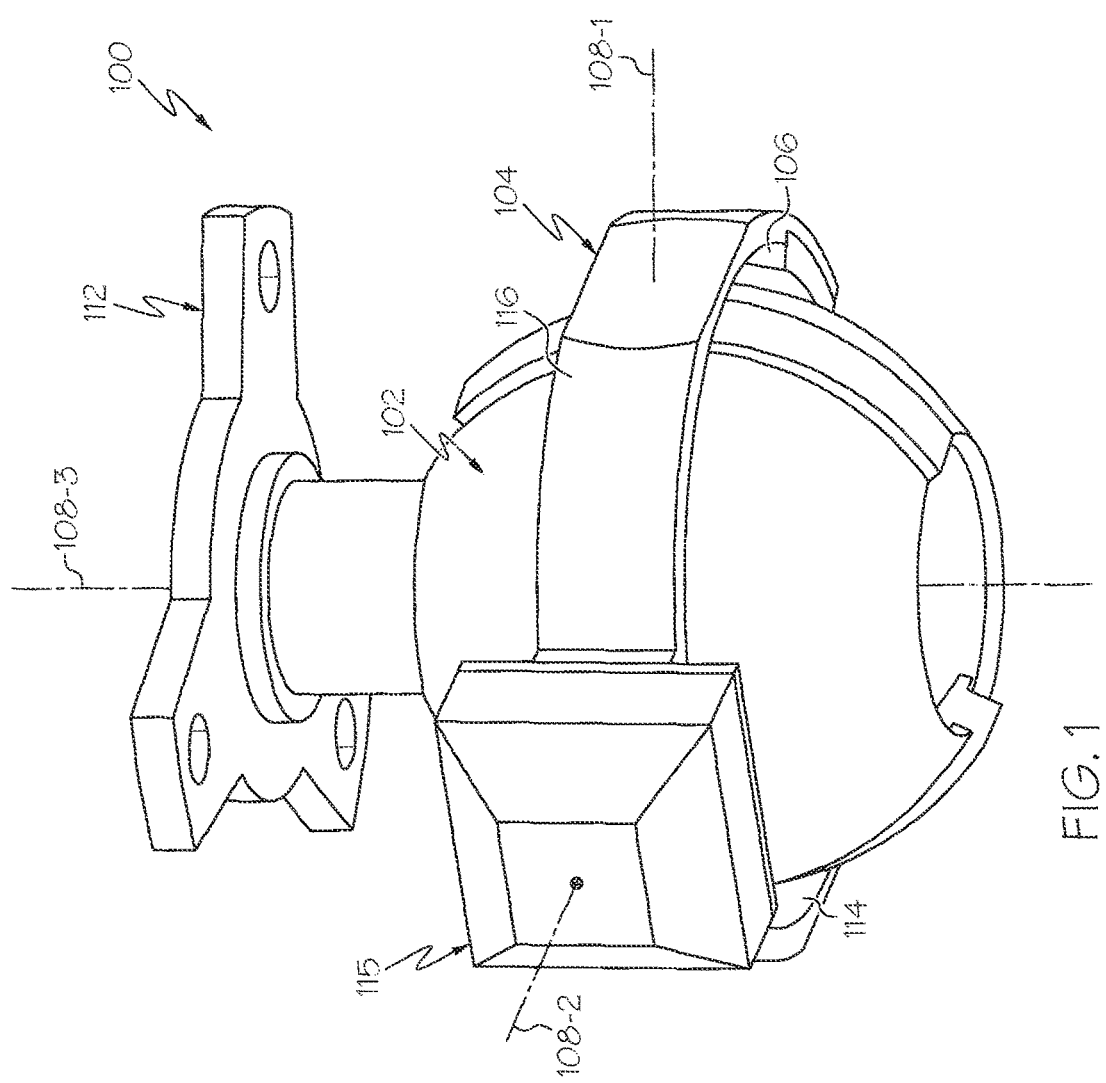
FIG. 1 depicts a plan view of one example embodiment of a multi-degree of freedom spherical actuator.

With reference first to FIG. 1, a plan view of one embodiment of a multi-degree of freedom spherical actuator 100 is depicted, and includes a spherical stator 102, an armature 104, and a plurality of magnets 106. The spherical stator 102, as this term implies, is spherically shaped, and thus has three perpendicularly disposed axes of symmetry 108—a first axis of symmetry 108-1, a second axis of symmetry 108-2, and a third axis of symmetry 108-3. The spherical stator 102 preferably comprises a magnetically permeable material, such as iron or an iron alloy, and preferably implemented as a hollow sphere. Preferably, the spherical stator 102 is fixedly mounted via, for example, a mount structure 112, to another non-depicted structure. The non-depicted structure may be, for example, a wall, a ceiling, a ship or aircraft bulkhead, or a ship or aircraft hull, just to name a few.

The armature 104 is spaced apart from, and surrounds at least a portion of, the spherical stator 102. The armature 104, which includes an inner surface 114 and an outer surface 116, is mounted such that it is movable relative to the spherical stator 102. Preferably, the armature 104 is mounted such that it is movable, relative to the spherical stator 102, about two or three of the axes of symmetry 108. As a result, a device 115, such as a sensor, a laser, or other suitable device, which may be mounted on the outer surface 116 of the armature 104, may be moved to a desired position. How this movement is accomplished will be described further below. Like the spherical stator 102, the armature 104 also preferably comprises a magnetically permeable material such as, for example, iron or an iron alloy.

The magnets 106 (only one visible in FIG. 1) are coupled to, and extend inwardly from, the inner surface 116 of the armature 104, and are spaced apart from the spherical stator 102. In the depicted embodiment, as shown more clearly in FIG. 2, the spherical actuator 100 includes a plurality of magnets 106. In the depicted embodiment, the spherical actuator 100 includes a pair of magnets—a first magnet 106-1 and a second magnet 106-2. It will be appreciated, however, that in other embodiments more than two magnets 106 may be used. It will additionally be appreciated that the magnets 106 may be variously shaped and dimensioned. For example, in the depicted embodiment the magnets 106 are generally arc-shaped, but in other embodiments the magnets 106 may be semi-spherically shaped, or any one of numerous other shapes if needed or desired. It will additionally be appreciated that the arc length of the magnets 106 may be varied, and that the magnets 106 may be permanent magnets or, if needed or desired, electromagnets.

Regardless of the shape and dimensions, however, the magnets 106 are preferably arranged such that the polarity of the first magnet 106-1 relative to the spherical stator 102 is opposite to the polarity of the second magnet 106-2. For example, in the embodiment depicted in FIG. 2, the north pole (N) of the first magnet 106-1 is disposed closer to the spherical stator 102, whereas the south pole (S) of the second magnet 106-2 is disposed closer to the spherical stator 102.

Figure 2:
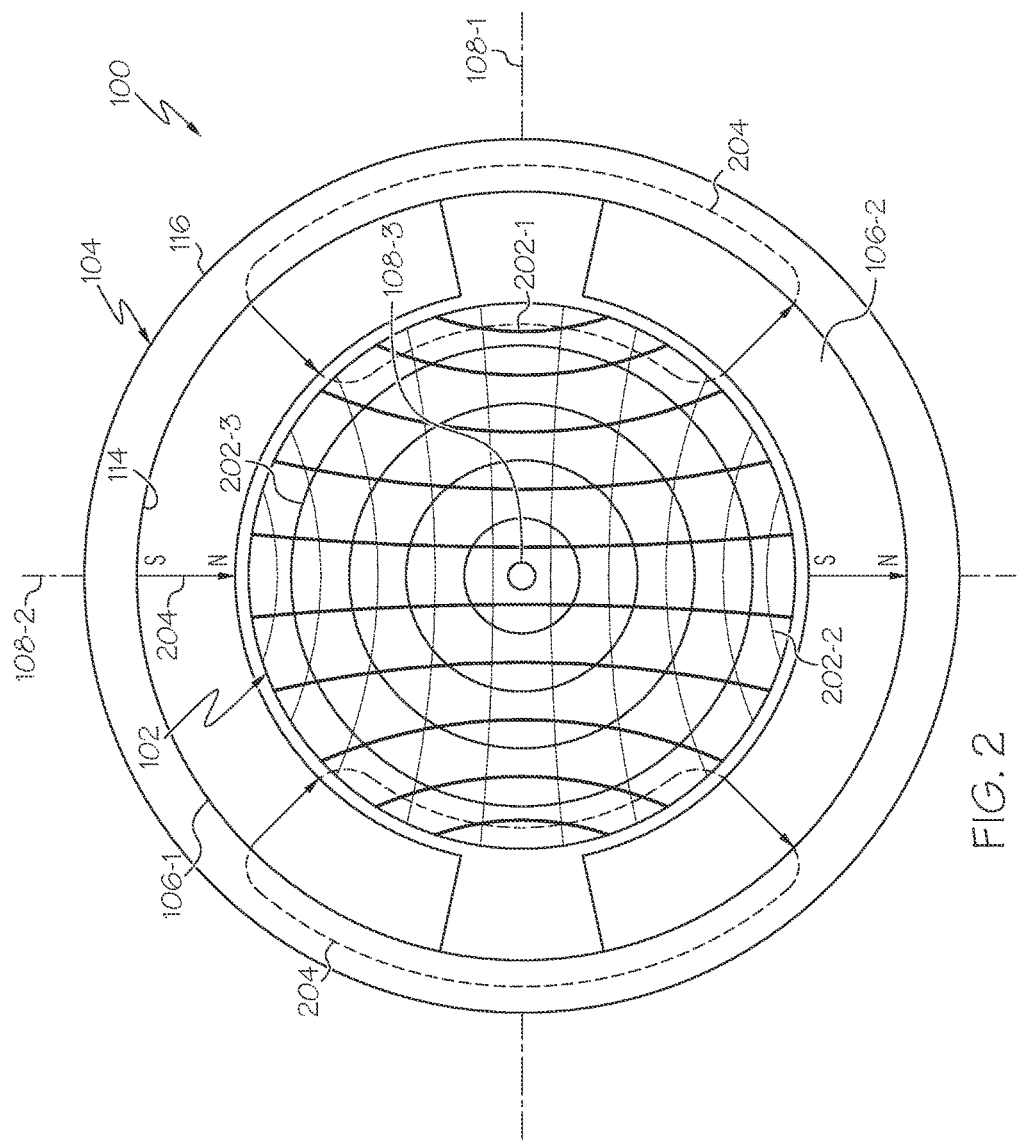
FIG. 2 depicts a simplified cross section view of a portion of a multi-degree of freedom spherical actuator.

As FIG. 2 also depicts, the spherical stator 102 has a plurality of coils 202 wound thereon. In the depicted embodiment, these include a first coil 202-1, a second coil 202-2, and a third coil 202-3. It will be appreciated, however, that in some embodiments the spherical actuator 102 may be implemented with only two coils instead of three. The first coil 202-1 is wound on the spherical stator 102 about the first axis of symmetry 108-1, the second coil 202-2 is wound on the spherical stator 102 about the second axis of symmetry 108-2, and the third coil 202-2, when included, is wound on the spherical stator 102 about the third axis of symmetry 202-3. It should be noted that a sphere has an infinite number of axes of symmetry. Thus, the first, second, and third axes of symmetry 108-1, 108-2, 108-3, could be any one of these axes of symmetry, so long as all three axes of symmetry are perpendicular to each other.

Before proceeding further, it is noted that the coils 202 may be wound manually with wires, or may be printed onto a flexible or spherical surface using known printing methods. Moreover, each coil 202 may have different characteristics. For example, the coils 202 may differ from each other in size, number of turns, and resistance, just to name a few characteristics. Doing so allows one to relatively easily and independently tailor each axis to have different performance characteristics, if needed or desired.

The configuration of the magnets 106 and coils 202 is such that magnetic flux 204 from travels from the first magnet 106-1 into the spherical stator 102 on one side and back out on the other side to the second magnet 106-2. The magnetic flux 204 also travels through the coils 202 on both sides of the spherical stator 102, and the magnetically permeable armature 104 provides the return path for the magnetic flux 204. As may be appreciated, when an electrical current is supplied to one or more of the coils 202, a Lorentz force is generated between the energized coil(s) 202 and the magnets 106, which in turn generates in a torque about one or more of the axes of symmetry 108. The direction of the generated torque, as may also by appreciated, is based on the direction of the current flow in the coil(s) 202.

Referring now to FIG. 3, an example of the torque that is generated when one of the coils 202 is energized will now be described. For clarity, and ease of illustration, only a single coil (e.g., the first coil 202-1) is depicted. As FIG. 3 depicts, when the first coil 202-1 is supplied with electrical current in the depicted direction, a torque is generated about the third axis of symmetry 108-3 in the clockwise direction (as viewed from the perspective of FIG. 3). It will be appreciated that reversing the direction of the current will generate a torque in the opposite (i.e., counterclockwise) direction. It will additionally be appreciated that the magnitude of the torque may be varied by varying the magnitude of the current supplied to the coil(s) 202.

Figure 4A:
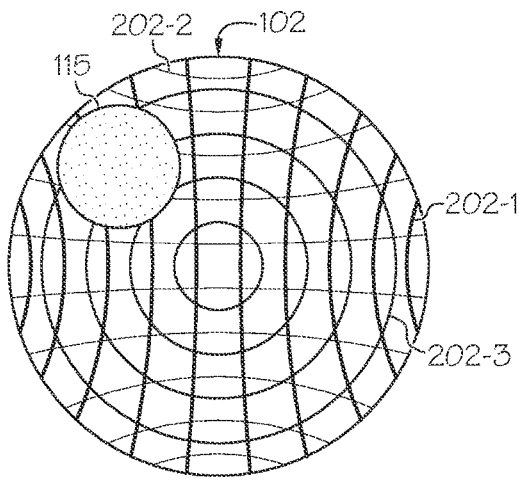
FIG. 4A-4C depict the multi-degree of freedom spherical actuator with the armature in different armature positions.
Figure 4B:
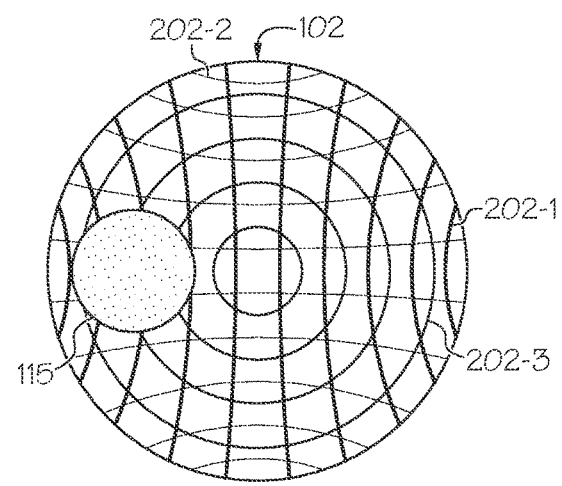
Figure 4C:
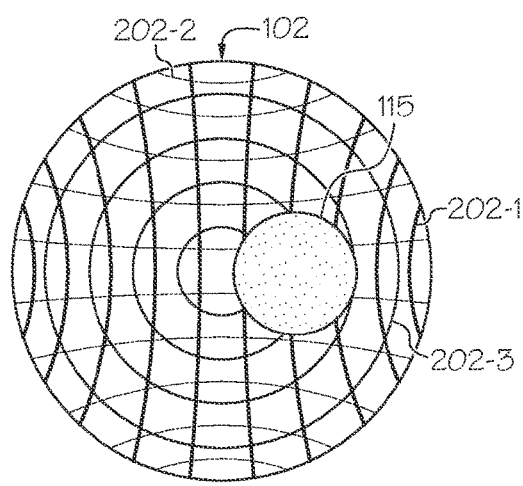

Because the spherical stator 102 is fixedly mounted, the torque that is generated will cause the armature 104 to move to an armature position relative to the spherical stator 102. The armature position may thus be controlled by controlling the magnitudes and directions of the currents in the coils 202. The armature 104, and thus the sensor device 115, can be moved to and held in a desired armature position relative to the spherical stator 102. This capability is illustrated in FIGS. 4A-4C. In FIG. 4A, all of the coils 202 are energized with currents of the same magnitude and direction. In FIG. 4B, the first 202-1 and third 202-3 coils are energized with currents of the same magnitude and direction, and the second coil 202 is not energized. In FIG. 4C, the first coil 202-1 is energized with a current of a first magnitude and first direction, the second coil 202 is not energized, and the third coil 202-3 is energized with a current of a second magnitude and second direction, where the second magnitude is double the first magnitude, and the second direction is opposite the first direction.

Figure 5:
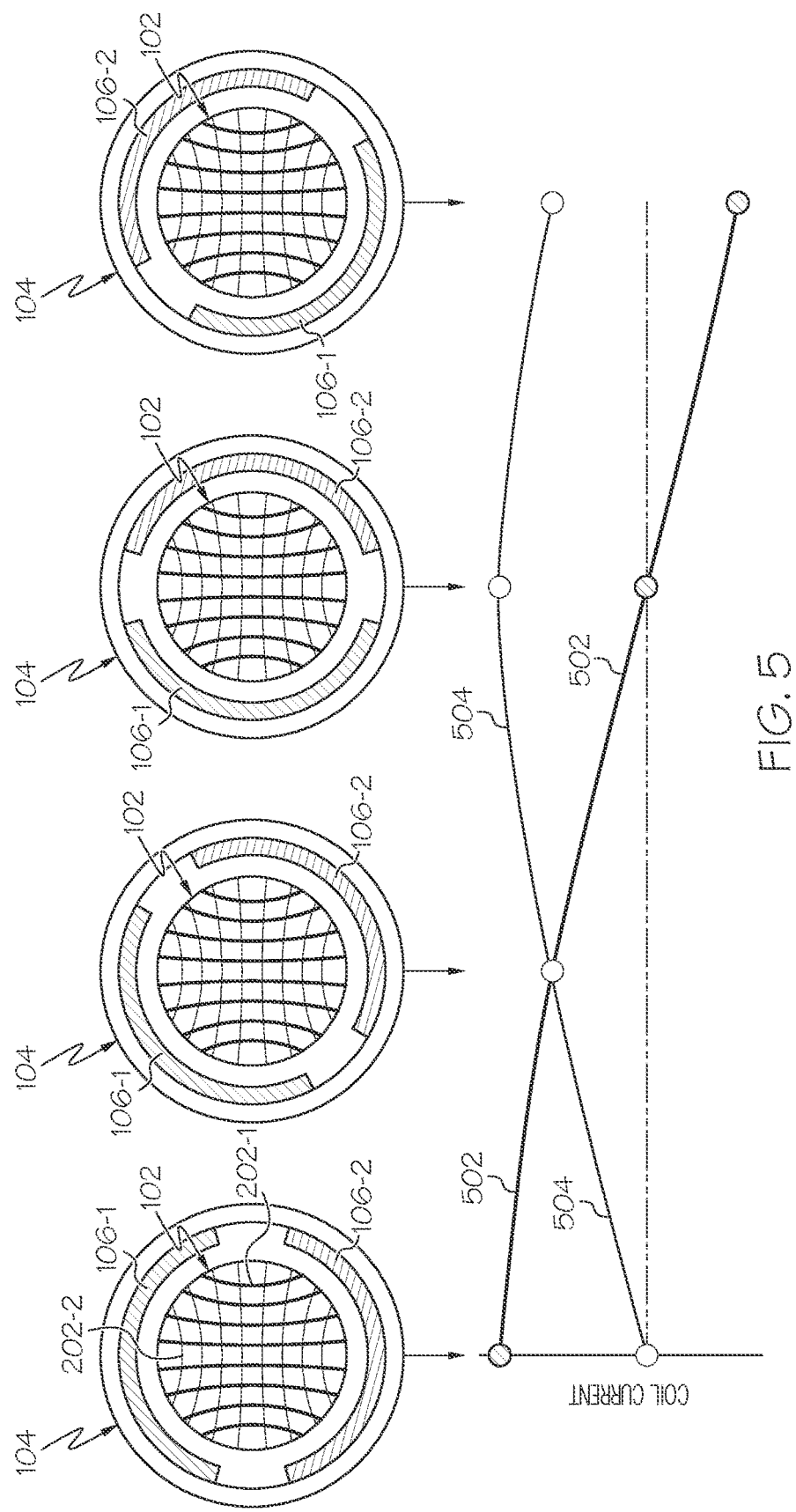
FIG. 5 depicts the manner in which the multi-degree of freedom spherical actuator may be operated as a motor.

The armature 104 can also (or instead) be made to continuously rotate about one of the axes of symmetry 108. This capability is illustrated in FIG. 5. In the depicted example, the armature 104 continuously rotates about the third axis of symmetry 108-3 by energizing the first coil 202-1 with a first alternating electrical current 502 and energizing the second coil 202-2 with a second alternating electrical current 504, where the first and second alternating currents 502, 504 are equal in amplitude and are 90-degrees out of phase. It will be appreciated that the armature 104 can be made to continuously rotate about the first or second axes of symmetry 108-1, 108-2 by controllably energizing, in a similar manner, the second and third coils 202-2, 202-3, or the first and third coils 202-1, 202-3, respectively. Moreover, while a relatively simple sinusoidal two-phase commutation technique is depicted and described herein, various other types of two-phase commutation techniques, such as block commutation, may also be used.

The spherical actuator 100 is also configured such that the armature 104 can be made to continuously rotate about one of the axes of symmetry 108 and simultaneously tilt to an armature position about one or both of the other axes of symmetry 108. This capability is illustrated in FIGS. 6-8. In particular, in each of FIGS. 6-8, the first and second coils 202-1, 202-2 are energized, as described above, to cause the armature 104 to be continuously rotated about the third axis of symmetry 108-3. In FIG. 6, however, the third coil 202-3 is energized with a third alternating current 602 that is in phase with the second alternating current 504. As a result, the armature 104 rotates, about the first axis of symmetry 108-1, to an armature position. In FIG. 7, the third coil 202-3 is energized with a third alternating current 702 that is in phase with the first alternating current 502. As a result, the armature 104 rotates, in a first direction about the second axis of symmetry 108-2, to an armature position. And in FIG. 8, the third coil 202-3 is energized with a third alternating current 802 that is out of phase with the second alternating current 504. As a result, the armature 104 rotates, in a second direction about the second axis of symmetry 108-2, to an armature position. As may be appreciated, the tilt angle of the armature 104 is controlled via the magnitude of the third alternating currents 602, 702, 802, and the tilt axis is controlled via the relative phase of the third alternating currents 602, 702, 802.

Figure 9:
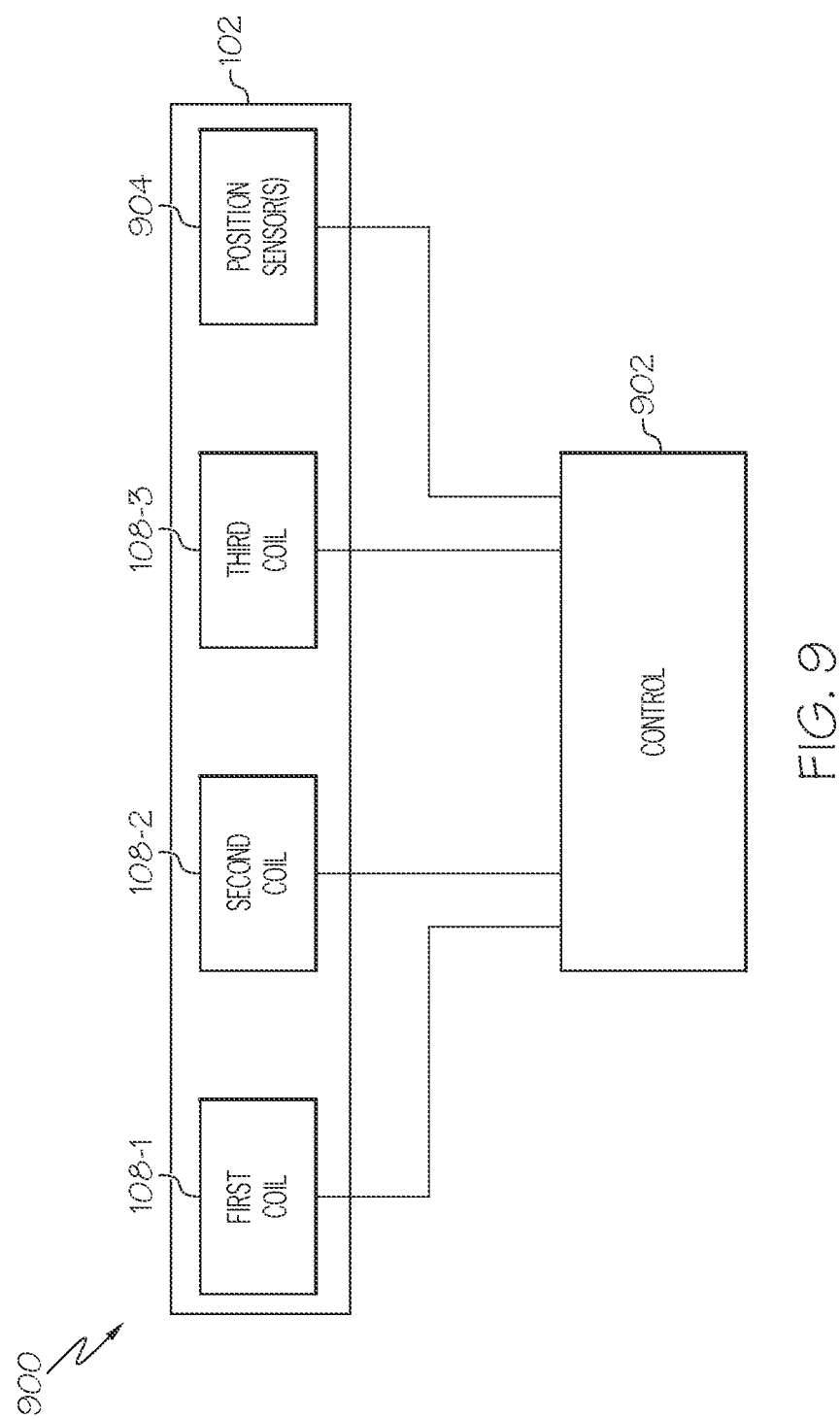
FIG. 9 depicts a functional block diagram of a multi-degree of freedom actuation control system.

Referring now to FIG. 9, a functional block diagram of a multi-degree of freedom actuation control system 900 that includes the multi-degree of freedom spherical actuator 100 of FIG. 1 is depicted. As FIG. 9 depicts, the system 900 includes a control 902 that is coupled to each of the first, second, and third coils 108. The control 902 is configured to control the current magnitudes and directions in each of the coils 108 to thereby control the armature position, and thus the position of the sensor device 115 (if included). The control 902 may be configured to implement this functionality using either open-loop control or closed-loop control. Open-loop control provides relatively lower cost, less complexity, relatively simple DC operation, and relatively lower size and weight. Closed-loop control provides higher accuracy and precision, higher bandwidth, and autonomous control. Various control techniques could be implemented in the control 902. Some non-limiting examples of suitable control techniques include PWM control and back EMF control.

If the control 902 implements closed-loop control, then the control system 900 additionally includes one or more position sensors 904. The number and type of position sensors 904 may vary. For example, the system 900 may include one or more sensors 904 to independently sense armature position along each axis of symmetry. Such sensors may be implemented using optical sensors, track balls, rotary sensors, or the like. In other embodiments, the sensor 904 may be implemented using an optical mask that is applied to the surface of the spherical stator 102, which can then be read by an optical sensor mounted on the inner surface 114 of the armature 104.

It will be appreciated that data and power may be transmitted to and from the coils 108 and position sensor(s) 904 (if included), using any one of numerous techniques. For example, data may be transmitted wirelessly, via flexible conductors, or via miniature slip rings, and power may be transmitted via flexible conductors, via miniature slip rings, or provided via a battery.

Figure 10:
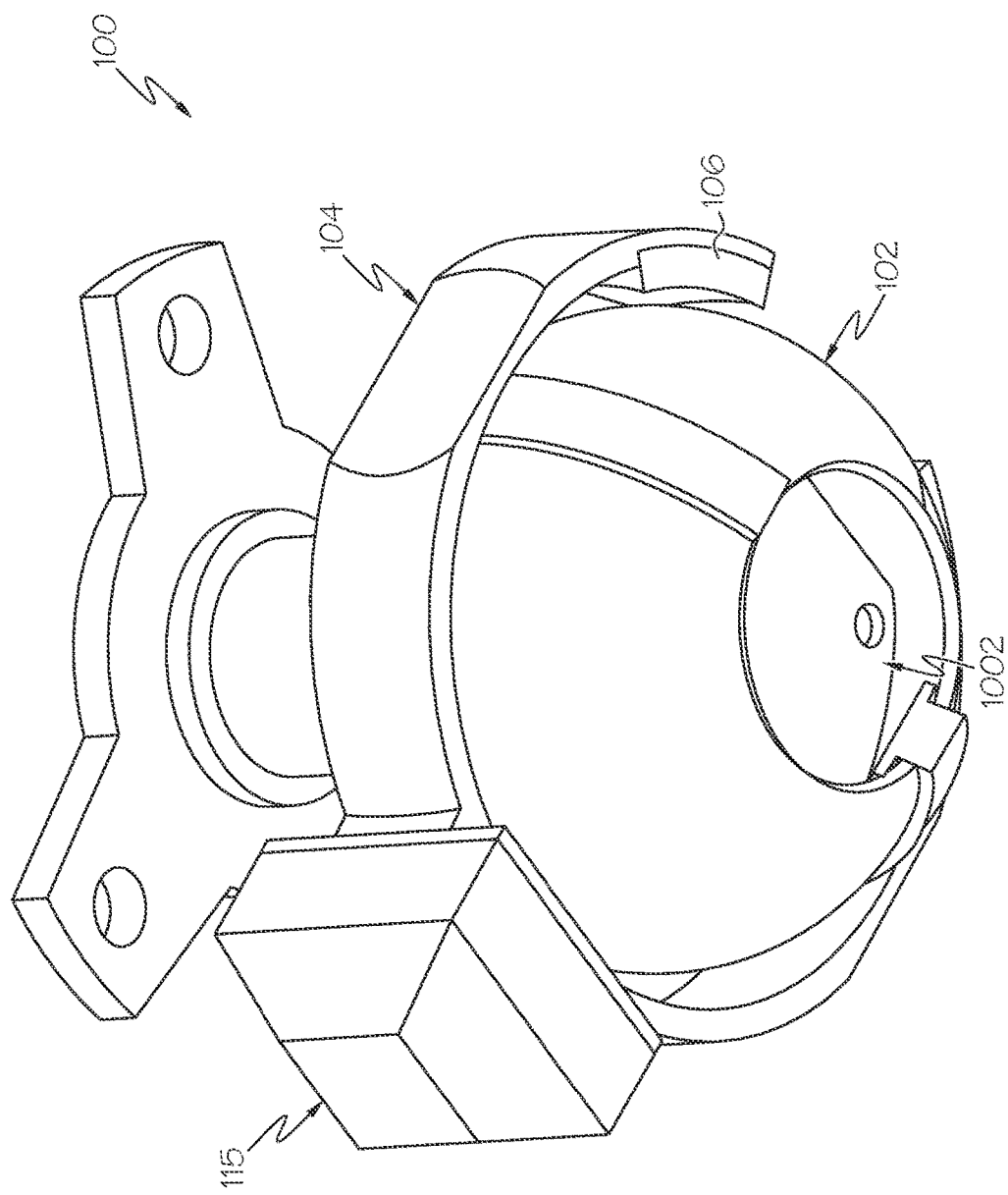
FIG. 10 depicts a plan view of the multi-degree of freedom spherical actuator with electronics mounted within the spherical stator.
Figure 11:
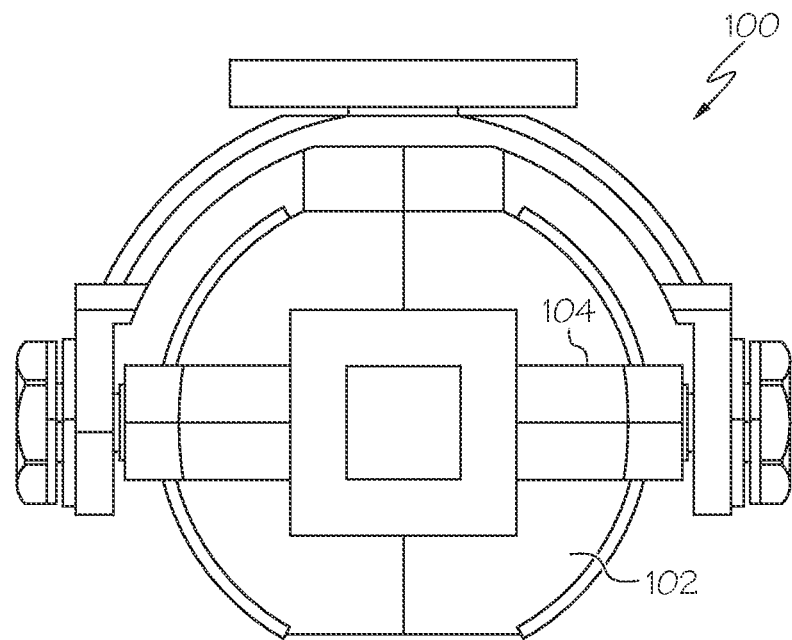
FIGS. 11 and 12, depict the multi-degree of freedom spherical actuator mounted in a gimbaled and un-gimbaled manner, respectively.
Figure 12:
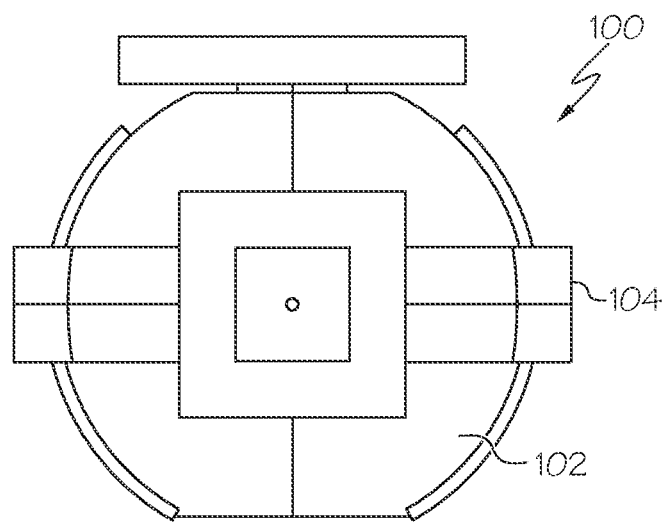

Because, as noted above, the spherical stator 102 is preferably a hollow sphere, the various electronics 1002 that comprise the control system 900 may, as depicted in FIG. 10, be mounted within the spherical stator 102. Moreover, the multi-degree of freedom spherical actuator 100 may be implemented in a gimbaled or an un-gimbaled configuration, depending upon the desired number of axes of free rotation of the armature 104. With the gimbaled configuration, an embodiment of which is depicted in FIG. 11, the armature 104 has two axes of free rotation, because the third is fixed. With the un-gimbaled configuration, an embodiment of which is depicted in FIG. 12, the armature has free rotation about all three axes of symmetry.

The multi-degree of freedom spherical actuator 100 may also be configured to provide a holding torque with no applied power, similar to a stepper motor. A simplified cross section view of one example embodiment of a multi-degree of freedom spherical actuator 100 that is configured to implement this stepper motor functionality is depicted in FIGS. 13A and 13B. As depicted therein, the multi-degree of freedom spherical actuator 100 is configured very similar to the previously described embodiments, and thus includes a spherical stator 102, an armature 104, a plurality of magnets 106, and a plurality of coils 202. One difference, however, is that that spherical stator 102 includes a plurality of spaced-apart protrusions 1302 (e.g., 1302-1, 1302-2, 1302-3, . . . 1302-N). The number and spacing of the protrusions may vary and, as FIG. 13A depicts, determines, at least in part, the resolution of the spherical actuator 100. It should be noted that in FIG. 13A, the spherical stator 102 and the armature 104 are misaligned. Conversely, the spherical stator 102 and the armature 104 are aligned in FIG. 13B, and the position may be held with no applied power.

Thermal management of the multi-degree of freedom spherical actuator 100 may be implemented using various techniques. Some non-limiting techniques include sizing the thickness of the spherical stator 102, as necessary, to conduct heat from the coils 202 to the device mounting structure, placing a fan inside the hollow spherical stator 102 to draw air in from one pole and out the other, providing efficient convective cooling, or enclosing the actuator 100 in a sealed transparent shell filled with a thermally conductive fluid.

The multi-degree of freedom spherical actuator 100 disclosed herein is relatively smaller, less cumbersome, and more efficient than known devices. It does not include a longitudinal coil that is difficult to wind, and it does not rely on a separate centering torque to implement open-loop position control of the armature 104. It can be used in various devices and systems to implement the functions of multiple actuator components. For example, when used in a control moment gyro (CMG) for satellite attitude control, the spherical actuator 100 can implement the functions of two spin motors and four torque motors. When used in a rotor swashplate control system for helicopters, the spherical actuator 100 can implement the functions of one spin motor and three linear actuators.

In addition to the above, the multi-degree of freedom spherical actuator 100 disclosed herein may be used in various technological devices and environements. For example, it may be coupled to a smartphone or other image capturing device to capture panoramic photos. It may be used in various vehicles (e.g., automobiles, watercraft, spacecraft, missiles, and aircraft) to provide, for example, sensor positioning, adaptive headlights, satellite antenna positioning, SONAR/LIDAR/RADAR directional control, just to name a few. It may be used to position solar cells, telescopes, and home security cameras. It may be used in various toy and gaming platforms. It may be used in robotics, in consumer devices (e.g., washing machines, dryers, dishwashers), and in vehicle transmission systems (e.g., continuous variable transmission (CVT).

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A multi-degree of freedom spherical actuator, comprising:
   a spherical stator having a first axis of symmetry, a second axis of symmetry, and a third axis of symmetry, the first, second, and third axes of symmetry disposed perpendicular to each other;
   a first coil wound on the spherical stator about the first axis of symmetry;
   a second coil wound on the spherical stator about the second axis of symmetry;
   an armature spaced apart from, and surrounding at least a portion of, the spherical stator, the armature having an inner surface and being movable relative to the spherical stator; and
   a plurality of magnets coupled to, and extending from, the inner surface of the armature, each of the magnets spaced apart from the spherical stator,
   wherein the armature will continuously rotate about the third axis of symmetry when:
      the first coil is energized with a first alternating electrical current;
      the second coil is energized with a second alternating electrical current; and
      the first and second alternating currents are equal in amplitude and are 180-degrees out of phase.

2. The actuator of claim 1, wherein:
   the armature is movable to an armature position relative to the spherical stator; and
   the armature position is controlled in response to current magnitudes and directions in the first and second coils.

3. The actuator of claim 1, further comprising:
   a third coil wound on the spherical stator about the third axis of symmetry,
   wherein the armature will rotate about one of the first axis of symmetry or the second axis of symmetry when the third coil is energized with a third alternating electrical current.

4. The actuator of claim 3, wherein:
   the armature will rotate about the first axis of symmetry when the first and third alternating electrical currents are in phase; and
   the armature will rotate about the second axis of symmetry when the second and third alternating electrical currents are in phase.

5. The actuator of claim 1, further comprising:
   a third coil wound on the spherical stator about the third axis of symmetry.

6. The actuator of claim 5, wherein:
   the armature is movable to an armature position relative to the spherical stator; and
   the armature position is controlled in response to current magnitudes and directions in one or more of the first, second, and third coils.

7. The actuator of claim 1, wherein the spherical stator comprises a magnetically permeable material.

8. The actuator of claim 1, wherein the spherical stator is hollow.

9. The actuator of claim 1, wherein armature comprises a magnetically permeable material.

10. A multi-degree of freedom spherical actuator, comprising:
    a spherical stator having a first axis of symmetry, a second axis of symmetry, and a third axis of symmetry, the first, second, and third axes of symmetry disposed perpendicular to each other;
    a first coil wound on the spherical stator about the first axis of symmetry;
    a second coil wound on the spherical stator about the second axis of symmetry;
    a third coil wound on the spherical stator about the third axis of symmetry; and
    an armature spaced apart from, and surrounding at least a portion of, the spherical stator, the armature having an inner surface and being movable relative to the spherical stator to an armature position;
    a plurality of magnets coupled to, and extending from, the inner surface of the armature, each of the magnets spaced apart from the spherical stator,
    wherein:
       the armature position is controlled in response to current magnitudes and directions in one or more of the first, second, and third coils,
       the armature will continuously rotate about the third axis of symmetry when (i) the first coil is energized with a first alternating electrical current, (ii) the second coil is energized with a second alternating electrical current, and (iii) the first and second alternating currents are equal in amplitude and are 180-degrees out of phase, and
       the armature will rotate about one of the first axis of symmetry or the second axis of symmetry when the third coil is energized with a third alternating electrical current.

11. The actuator of claim 10, wherein:
    the armature will rotate about the first axis of symmetry when the first and third alternating electrical currents are in phase; and
    the armature will rotate about the second axis of symmetry when the second and third alternating electrical currents are in phase.

12. The actuator of claim 10, wherein the spherical stator and the armature each comprise a magnetically permeable material.

13. The actuator of claim 10, wherein the spherical stator is hollow.

14. A multi-degree of freedom actuation control system, comprising:
    a spherical stator having a first axis of symmetry, a second axis of symmetry, and a third axis of symmetry, the first, second, and third axes of symmetry disposed perpendicular to each other;
    a first coil wound on the spherical stator about the first axis of symmetry;
    a second coil wound on the spherical stator about the second axis of symmetry;
    a third coil wound on the spherical stator about the third axis of symmetry;

an armature spaced apart from, and surrounding at least a portion of, the spherical stator, the armature having an inner surface and being movable to an armature position relative to the spherical stator;

a plurality of magnets coupled to, and extending from, the inner surface of the armature, each of the magnets spaced apart from the spherical stator; and a control coupled to the first, second, and third coils and configured to control current magnitudes and directions in each of the first, second, and third coils to thereby control the armature position, wherein:
the armature will continuously rotate about the third axis of symmetry when (i) the controller energizes the first coil with a first alternating electrical current (ii) the controller energizes the second coil with a second alternating electrical current, and (iii) the first and second alternating currents are equal in amplitude and are 180-degrees out of phase; and the armature will rotate about one of the first axis of symmetry or the second axis of symmetry when the controller energizes the third coil with a third alternating electrical current.

15. The actuator of claim 14, further comprising:
one or more position sensors configured to sense the armature position and supply position signals representative thereof, wherein the control is coupled to receive the position signals and is further configured, in response thereto, to control the current magnitudes and directions.

16. The actuator of claim 14, wherein:
the armature will rotate about the first axis of symmetry when the first and third alternating electrical currents are in phase; and the armature will rotate about the second axis of symmetry when the second and third alternating electrical currents are in phase.

17. The actuator of claim 14, wherein:
the spherical stator is hollow and comprises a magnetically permeable material; and the armature comprises a magnetically permeable material.

18. A multi-degree of freedom spherical actuator, comprising:
a spherical stator having a first axis of symmetry, a second axis of symmetry, and a third axis of symmetry, the first, second, and third axes of symmetry disposed perpendicular to each other, the spherical stator comprising a magnetically permeable material;

a first coil wound on the spherical stator about the first axis of symmetry;

a second coil wound on the spherical stator about the second axis of symmetry;

a third coil wound on the spherical stator about the third axis of symmetry;

an armature spaced apart from, and surrounding at least a portion of, the spherical stator, the armature having an inner surface and being movable relative to the spherical stator; and a plurality of magnets coupled to, and extending from, the inner surface of the armature, each of the magnets spaced apart from the spherical stator, and each magnet configured such that magnetic flux from one of the magnets travels into the spherical stator on one side and out on another side to a different one of the magnets, wherein, when an electrical current is supplied to one or more of the first, second, and third coils, a Lorentz force is generated between the coils supplied with the electrical current and the magnets, to thereby generate a torque.

* * * * *